Dec. 21, 1937. G. E. LOFGREN 2,102,802
COUPLING
Filed Jan. 30, 1936
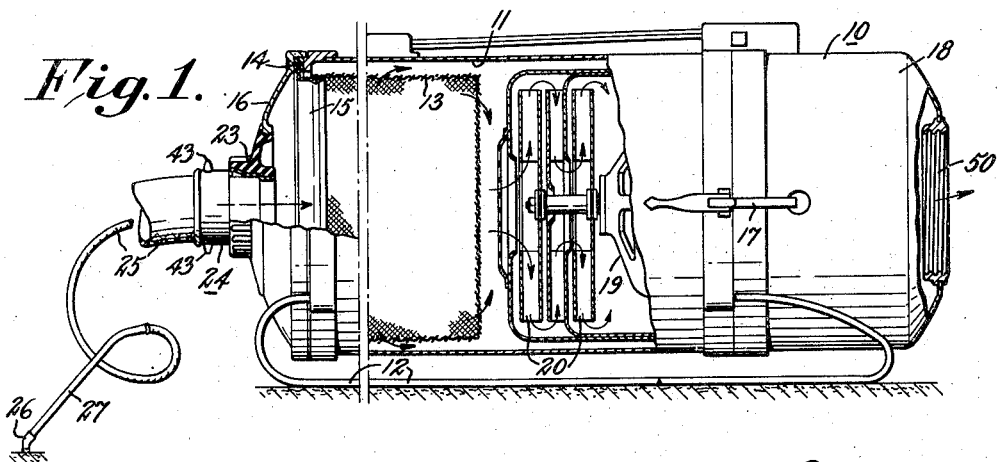
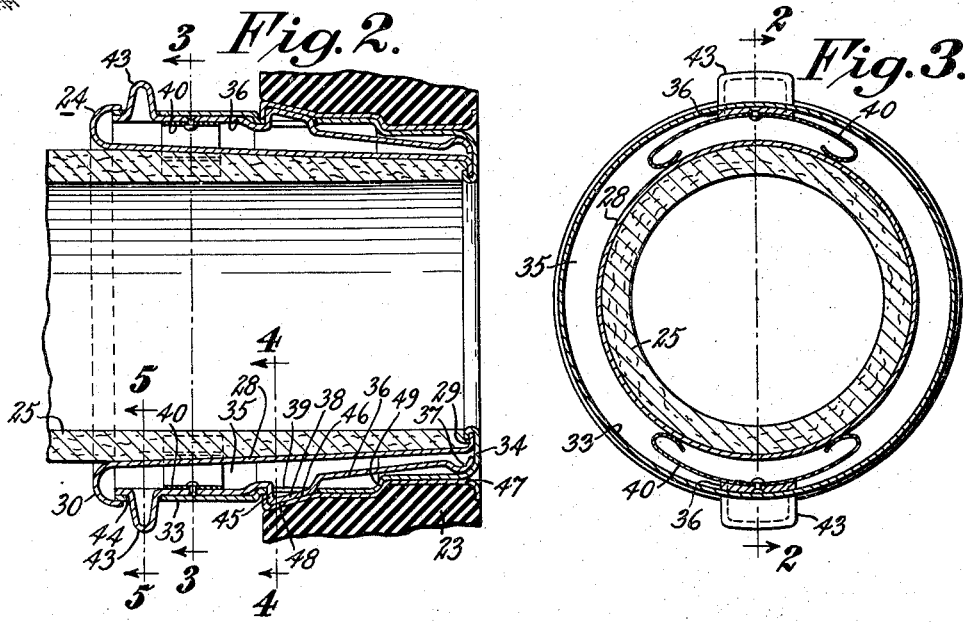
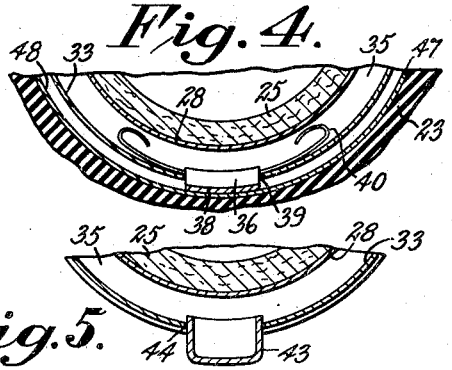
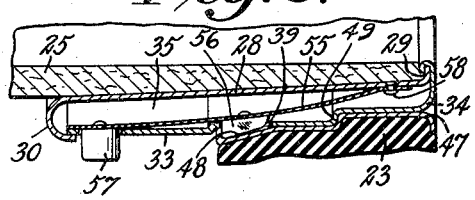
INVENTOR,
Gustaf Einar Lofgren
BY
his ATTORNEY.

Patented Dec. 21, 1937

2,102,802

UNITED STATES PATENT OFFICE 2,102,802

COUPLING

Gustaf Einar Lofgren, Riverside, Conn., assignor to Electrolux Corporation, Dover, Del., a corporation of Delaware Application January 30, 1936, Serial No. 61,473

9 Claims. (Cl. 285—174)

My invention relates to a releasable and rotatable coupling for securing two hollow members in substantially fluid-tight relationship. My invention is particularly well adapted for use in connecting a hose to a vacuum cleaner unit, especially of the type wherein the unit rests on the floor and is connected to a suction nozzle by means of a flexible tube which is also employed to pull the unit over the floor. The connection consequently must be able to withstand tension while at the same time being rotatable so as to prevent kinking of the hose and being readily releasable in order that the hose may be easily detached from the cleaner unit.

Among the objects of my invention is to provide a connection having the above outlined characteristics and in which a releasable latch mechanism is mounted entirely outside of the interior of the hose, thus obviating any interference with the passage of air and dust through the hose and preventing the possibility of leakage around the latch mechanism.

Further objects and advantages of my invention will be apparent from the following description considered in connection with the accompanying drawing which forms a part of the specifications and of which:

Fig. 1 is a side-view partially in cross-section of my invention as applied to a vacuum cleaner of the above type;

Fig. 2 is a cross-sectional view on an enlarged scale of the coupling shown in Fig. 1 and is taken on the line 2—2 of the Fig. 3;

Fig. 3 is a cross-sectional view taken on the line 3—3 of Fig. 2;

Fig. 4 is a cross-sectional view taken on the line 4—4 of Fig. 2;

Fig. 5 is a cross-sectional view taken on the line 5—5 of Fig. 2; and

Fig. 6 is a cross-sectional view of another embodiment of my invention.

Referring to Fig. 1, reference character 10 designates generally a vacuum cleaner unit which includes a casing 11 adapted to be movably supported on a horizontal surface by means of a pair of runners 12. A dust bag 13 is disposed within casing 11 and secured in place by means of a flange 14 on the dust bag ring 15 being clamped in place by means of a cover member 16. Cover 16 may be secured to the casing 11 in any suitable manner, as by spring clips such as are shown at 17 for securing a rear cover member 18 to the casing. There is also disposed within the casing 11 an electric motor 19 driving centrifugal fan 20.

Cover 16 is formed with a central threaded opening adapted to receive a reducing member 23 which is likewise formed with a central opening. Reference character 24 designates generally the part of my improved coupling which is secured to the hose 25 and cooperates with member 23 to form a releasable and rotatable connection between the hose and the cleaner unit. The other end of the hose may be connected to a suction nozzle 26 by means of a rigid hollow handle 27.

My improved coupling is shown more in detail in Figs. 2 through 5. Reference character 28 designates a substantially cylindrical sleeve which is fixed to one end of hose 25, as by being glued thereto. Sleeve 28 is shown slightly conical in order that it may be more readily secured to the hose. One end of sleeve 28 is formed with an inturned flange 29 while the other end is formed with an out-turned flange 30 semi-circular in cross-section as is clearly shown in Fig. 2. Member 28 forms an inner wall member while an outer wall member is formed by a substantially cylindrical part 33. One end of part 33 is formed with an inwardly extending flange 34 which is secured to flange 29 as by being rolled or crimped around the inner edge thereof. The other end of part 33 is retained within flange 30. Inner wall 28 and outer wall 33 thus define a substantially annular space 35 which is entirely out of communication with the interior of hose 25 by virtue of the fact that inner wall 28 and/or the portion of the hose 25 therewithin are imperforate.

Mounted within space 35 are one or more latch members 36. In the embodiment herein shown two latch members are provided although a lesser or greater number could be employed. If more than one are employed, it is preferable that they be disposed equi-distantly around the circumference of the coupling. One end of latch member 36 is arcuate, as shown at 37, whereby it may pivot against the arcuate portion of flange 34. At a more or less intermediate point the latch member is formed with a projection or catch 38 which is adapted to extend through a correspondingly located opening 39 in outer wall 33. A spring 40 is secured at its center to latch member 36 and is so shaped that its ends bear against inner wall 28, thus tending to hold the latch member against outer wall 33 with catch 38 projecting through the opening 39. The latch member is further formed with a projecting finger piece 43 which extends through an opening 44 formed in outer wall 33. The dimensions of catch 38 and finger piece 43 are substantially the same as those of openings 39 and 44, respectively, whereby the latch member 36 is retained in position within space 35 without requiring to be actually fastened to any of the parts.

Catch 38 is formed with a substantially flat radial face 45 and an inclined face 46. The central opening in member 23 is provided with a liner 47 which is formed with a groove 48 adapted to receive catch 38 when the latter is projected through the opening 39. Groove 48 is formed with a flat radial face, and, if desired, a conical face corresponding to the similar faces on catch 38.

Outer wall 33 and liner 47 are formed with cooperating shoulders 49 which limit axial movement of the coupling member 24 with respect to member 23 in one direction. Engagement of the radial faces on catch 38 and groove 48 limits axial movement in the other direction. Assuming the parts of the coupling to be connected, as shown particularly in Fig. 2, the hose may freely rotate within member 23 due to the fact that groove 48 extends around the entire circumference, whereby projections 38 may move circularly therein. Tension imposed on the hose will not pull the coupling apart by virtue of the fact that the radial face 45 on catch 38 engages the radial face of groove 48 and thereby prevents axial movement of the parts. On the other hand, if it is desired to separate the coupling, it is grasped by the hand so that finger pieces 43 are forced inwardly, thus pivoting latch 36 about its arcuate end 37 against the force of spring 40, which results in catch 38 being retracted into space 35 sufficiently so that its radial face 45 is disengaged from the groove 38. Thereupon, the coupling may be separated by merely pulling the hose to the left, as viewed in Figs. 1 and 2.

To connect the coupling, it is only necessary to insert member 24 within the bore of member 23 and push it to the right, as viewed in Figs. 1 and 2. When the inclined face 46 of catch 38 strikes the outer end of sleeve 47, it causes latch 36 to be pivoted against the force of spring 40 so as to permit the catch to pass into sleeve 47 until it is in alignment with groove 46, whereupon it is snapped outwardly by spring 40 to engage within the groove. Hence, it is not necessary to press on members 43 when engaging the coupling.

Rotation of fan 20 by motor 19 causes a current of air to be drawn into nozzle 26 and through handle 27 and hose 25 to the interior of the dust bag 13. If the nozzle is passed over a dusty surface, dust will be entrained with the air and deposited within the dust bag, while the air, freed of the dust, will pass through the material of the bag to the fan. From here, it will be discharged through an outlet opening 50 in rear cover 18 to the atmosphere. It will be noted that the interior of hose 25 is wholly unobstructed within coupling member 24 and hence, there is no opportunity for articles drawn in, particularly large articles such as pins, being caught and clogging the hose. Moreover, the space 35 in which is mounted the latch mechanism is entirely out of communication with the interior of the hose whereby no leakage of air into the hose can take place through openings 39 and 44. Also, dust cannot be deposited within space 35.

When using the vacuum cleaner, the operator passes the nozzle 26 back and forth over a surface to be cleaned and gradually advances over the surface. The unit 10 is pulled along by means of the hose 25 which may be more or less twisted by manipulating the handle 27 and nozzle 26. However, the rotatable connection between coupling members 23 and 24 allows such twisting of the hose without the danger of its becoming kinked.

As shown, latch member 36 consists of a single piece suitably stamped or otherwise formed so as to provide catch 38 and finger piece 43. Obviously, however, either one or both of these could be separate pieces secured to the latch member.

The embodiment shown in Fig. 6 differs from that previously described in that latch member 36 is replaced by a strip of resilient material 55 to which is secured a catch 56 and a finger piece 57. The end of strip 55 remote from finger piece 57 is fixed, as by being riveted at 58, to inner wall 28. This construction eliminates the separate spring 40 shown in the first embodiment. Due to the fact that strip 55 consists of spring steel, it is not feasible to form the catch and finger piece directly therein by stamping, but as shown, catch 56 and finger piece 57 are separate members secured to the strip 55. Resilient strip 55 is so formed that catch 56 normally is held extending through opening 39 and may be retracted by pressing on finger piece 57.

While I have shown two more or less specific embodiments of my invention, it is to be understood that this has been done for the purpose of illustration only and that the scope of my invention is not to be limited thereto, but is to be determined by the appended claims interpreted as broadly as the prior art will permit.

What I claim is:

1. A detachable coupling device including spaced substantially cylindrical walls of sheet metal defining an annular space and latch mechanism mounted in said space and projecting through the outer of said walls, the interior of the inner of said walls being uninterrupted and adapted to be secured to the outside of a hose, whereby said space is out of communication with the interior of the hose.

2. In a device of the class described, a hose, sheet metal wall structure defining an annular space around said hose adjacent to one end thereof, the innermost surface of said wall structure being uninterrupted and in contact with said hose, said space being closed with respect to the interior of said hose, and latch mechanism mounted within said space.

3. A detachable coupling device adapted to be secured to the end of a hose including substantially cylindrical walls joined together at their ends and defining an annular space closed with respect to the interior of said hose, diametrically opposed latch members mounted in said space and normally projecting through openings in the outer of said walls, and manually operable means extending through openings in said outer wall for retracting said latch members.

4. A detachable coupling device adapted to be secured to the end of a hose including substantially concentric sheet metal walls defining a substantially annular space, the inner of said walls being imperforate and having an uninterrupted interior surface in contact with said hose, a latch member mounted in said space and projectable through an opening in the outer of said walls, resilient means for projecting said latch through said opening, and manually operable means extending through an opening in said outer wall for retracting said latch member against the force of said resilient means.

5. A hose having a detachable coupling device including a substantially cylindrical wall defining an annular space out of communication with the interior of the hose and a latch member pivoted at one end within said space and formed with a projection extending through an opening in said wall, said projection having a close fit in said opening whereby said latch member is retained in position within said space.

6. A hose having a detachable coupling device including a substantially cylindrical wall defining an annular space out of communication with the interior of the hose and a latch member pivoted at one end within said space and formed with a catch extending through an opening in said wall, resilient means for projecting said catch through said opening, and a manually operable projection on said latch extending through an opening in said wall, said catch and said projection having close fits in the respective openings whereby said latch member is retained in place within said space.

7. A detachable coupling device for a hose including an inner substantially cylindrical member and an outer substantially cylindrical member, said members being joined and held in spaced relation by flanges formed at the ends of the members, a latch member mounted within said space and normally projecting through an opening in said outer wall, and means extending through an opening in said outer wall for retracting said latch member.

8. A detachable coupling device for a hose including an inner substantially cylindrical wall formed with an in-turned flange at one end and an out-turned flange at the other end, an outer substantially cylindrical wall having an in-turned flange at one end engaging the in-turned flange of said inner wall, the opposite end of said outer wall engaging said out-turned flange, whereby an annular space is defined between said walls, a latch member mounted within said space and normally projecting through an opening in said outer wall, and means extending through an opening in said outer wall for retracting said latch member.

9. A detachable coupling device for a hose including substantially cylindrical walls joined together at their ends to form an annular space closed with respect to the interior of said hose, a latch member pivoted at one end within said space and formed with a catch spaced from said end and extending through an opening formed in the outer of said walls, resilient means within said space bearing against said latch member for projecting said catch outwardly through said opening, and a finger piece secured to said latch member adjacent to said spring and projecting through an opening in said outer wall and operable to pivot said latch member against the force of said spring to retract said catch.

GUSTAF EINAR LOFGREN.